(12) United States Patent
Stoesz et al.

(10) Patent No.: US 8,417,084 B2
(45) Date of Patent: Apr. 9, 2013

(54) DISTRIBUTED OPTICAL PRESSURE AND TEMPERATURE SENSORS

(75) Inventors: Carl W. Stoesz, Houston, TX (US); Clark Davis Boyd, Radford, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/166,956

(22) Filed: Jul. 2, 2008

(65) Prior Publication Data
US 2009/0003760 A1 Jan. 1, 2009

Related U.S. Application Data

(63) Continuation-in-part of application No. 11/960,007, filed on Dec. 19, 2007.

(60) Provisional application No. 60/885,048, filed on Jan. 16, 2007.

(51) Int. Cl.
*G02B 6/00* (2006.01)
(52) U.S. Cl. .......................... 385/137; 73/705
(58) Field of Classification Search ............... 385/15, 385/39, 137; 73/705
See application file for complete search history.

(56) References Cited

U.S. PATENT DOCUMENTS

| | | | |
|---|---|---|---|
| 4,659,923 A * | 4/1987 | Hicks, Jr. ................ | 250/227.19 |
| 5,390,546 A * | 2/1995 | Wlodarczyk ................ | 73/715 |
| 5,399,854 A * | 3/1995 | Dunphy et al. ........... | 250/227.17 |
| 5,438,873 A * | 8/1995 | Wlodarczyk et al. ........... | 73/705 |
| 5,452,087 A * | 9/1995 | Taylor et al. ................ | 356/480 |
| 5,515,459 A * | 5/1996 | Farhadiroushan .............. | 385/12 |
| 5,600,070 A * | 2/1997 | Wlodarczyk ................ | 73/715 |
| 5,633,960 A * | 5/1997 | Lagakos et al. ................ | 385/12 |
| 5,737,278 A * | 4/1998 | Frederick et al. ............. | 367/149 |
| 5,805,753 A * | 9/1998 | Lagakos et al. .............. | 385/123 |
| 5,841,131 A * | 11/1998 | Schroeder et al. ........ | 250/227.17 |
| 5,877,426 A * | 3/1999 | Hay et al. .......................... | 73/733 |
| 6,016,702 A * | 1/2000 | Maron ............................ | 73/705 |
| 6,018,390 A * | 1/2000 | Youmans et al. ............. | 356/477 |
| 6,122,971 A * | 9/2000 | Wlodarczyk ................ | 73/705 |
| 6,131,465 A * | 10/2000 | Wlodarczyk et al. ........... | 73/715 |
| 6,218,661 B1 * | 4/2001 | Schroeder et al. ........ | 250/227.14 |

(Continued)

FOREIGN PATENT DOCUMENTS

JP 2003130934 A * 5/2003
WO 2008031181 A1 3/2008

OTHER PUBLICATIONS

Merriam-Webster dictionary; available at http://www.merriam-webster.com/dictionary/adhere.*
E.P. Popov, "Mechanics of Materials," 2nd Ed., Prentice-Hall, 1976, pp. 288-292, 557-564.

(Continued)

*Primary Examiner* — Charlie Peng
*Assistant Examiner* — Peter Radkowski
(74) *Attorney, Agent, or Firm* — Cantor Colburn LLP

(57) ABSTRACT

Disclosed herein is a carrier for an optical fiber having a plurality of optical sensors located thereon. The carrier has a test section comprising a cavity and at least one geometric discontinuity, wherein in response to a pressure applied to the test section, a stress concentration is formed proximate to the geometric discontinuity, and wherein the optical sensor is adhered to at least a part of the geometric discontinuity. The cavity may be filled with a liquid or a gel. A temperature optical sensor may also be provided adjacent to the pressure optical sensor.

17 Claims, 6 Drawing Sheets

U.S. PATENT DOCUMENTS

| | | | |
|---|---|---|---|
| 6,233,374 B1* | 5/2001 | Ogle et al. | 385/13 |
| 6,278,811 B1* | 8/2001 | Hay et al. | 385/13 |
| 6,422,084 B1* | 7/2002 | Fernald et al. | 73/705 |
| 6,452,667 B1* | 9/2002 | Fernald et al. | 356/73.1 |
| 6,490,931 B1* | 12/2002 | Fernald et al. | 73/705 |
| 6,668,656 B2* | 12/2003 | Fernald et al. | 73/705 |
| 6,701,775 B1* | 3/2004 | Popielas et al. | 73/35.12 |
| 6,738,145 B2* | 5/2004 | Sherrer et al. | 356/480 |
| 6,820,488 B2* | 11/2004 | Lenzing et al. | 73/705 |
| 6,823,738 B1* | 11/2004 | Wlodarczyk et al. | 73/705 |
| 6,838,660 B2* | 1/2005 | Duncan et al. | 250/227.14 |
| 6,898,339 B2* | 5/2005 | Shah et al. | 385/13 |
| 6,945,117 B2* | 9/2005 | Boyd et al. | 73/729.1 |
| 6,952,948 B2* | 10/2005 | Herbert et al. | 73/35.12 |
| 6,998,599 B2* | 2/2006 | Lagakos et al. | 250/227.16 |
| 7,000,698 B2* | 2/2006 | Mayeu et al. | 166/255.1 |
| 7,020,354 B2* | 3/2006 | Lagakos et al. | 385/12 |
| 7,062,140 B2* | 6/2006 | Bjarklev et al. | 385/125 |
| 7,149,374 B2* | 12/2006 | Lagakos et al. | 385/12 |
| 7,176,048 B1* | 2/2007 | Burns | 438/53 |
| 7,196,318 B2* | 3/2007 | Shin et al. | 250/227.16 |
| 7,308,165 B2* | 12/2007 | Arias Vidal et al. | 385/13 |
| 7,322,247 B2* | 1/2008 | Boyd et al. | 73/729.1 |
| 7,340,118 B2* | 3/2008 | Wlodarczyk et al. | 385/12 |
| 7,379,629 B1* | 5/2008 | Burns | 385/12 |
| 7,443,509 B1* | 10/2008 | Burns | 356/480 |
| 2001/0015276 A1* | 8/2001 | Pringle et al. | 166/320 |
| 2002/0003917 A1* | 1/2002 | Sherrer et al. | 385/12 |
| 2004/0114849 A1* | 6/2004 | Shah et al. | 385/13 |
| 2004/0140092 A1* | 7/2004 | Robison | 166/255.1 |
| 2004/0233458 A1* | 11/2004 | Frick | 356/480 |
| 2004/0244502 A1* | 12/2004 | Youngner et al. | 73/862.59 |
| 2005/0062979 A1* | 3/2005 | Zhu et al. | 356/480 |
| 2007/0041019 A1 | 2/2007 | Schmidt | |

OTHER PUBLICATIONS

International Search Report and Written Opinion, Mailed Feb. 3, 2010, International Appln. No. PCT/US2009/049046, Written Opinion 5 Pages, International Search Report 4 Pages.

JP2002504663(JP14504663). "Fiber Optic Pressure Transducers and Pressure Sensing System Incorporating Same". Publication Date: Feb. 12, 2002. Abstract Only.

Patents Act 1977: Examination Report Under Section 18(3). Application No. GB0912342.3. Mailed Feb. 1, 2010.

* cited by examiner

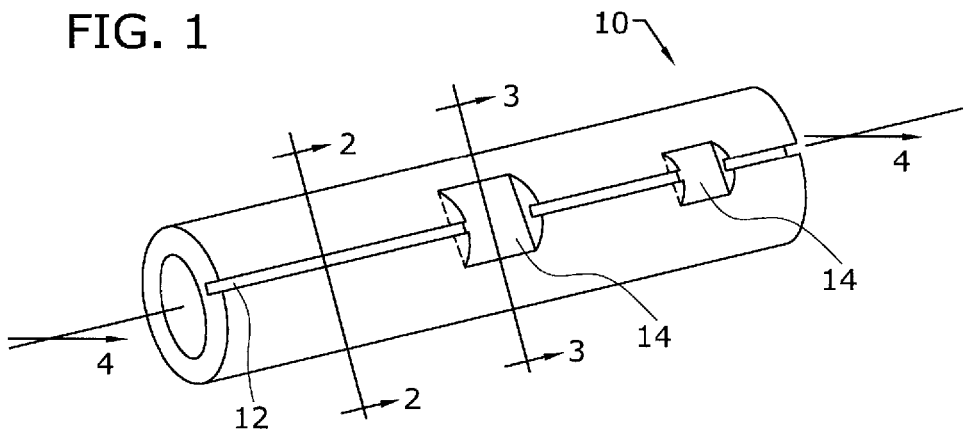
FIG. 1
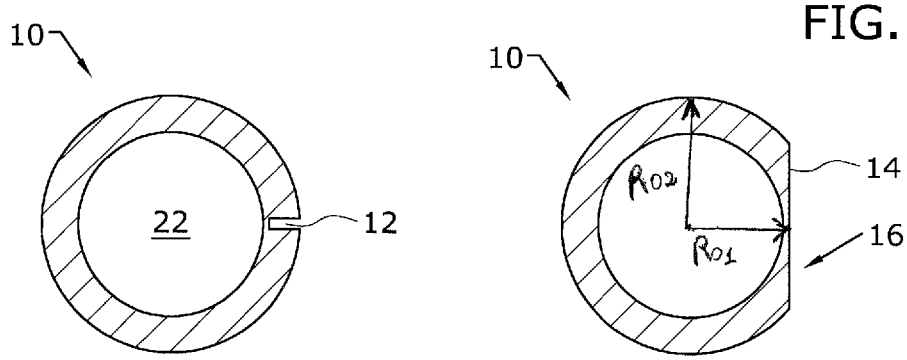
FIG. 2
FIG. 3A
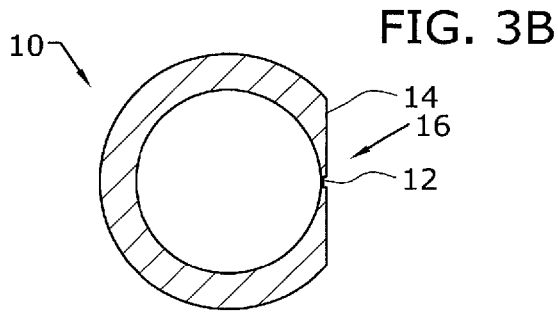
FIG. 3B
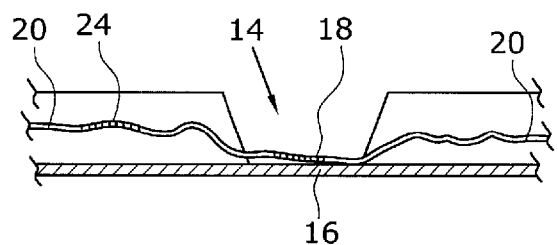
FIG. 4

DISTRIBUTED OPTICAL PRESSURE AND TEMPERATURE SENSORS

CROSS REFERENCE TO RELATED APPLICATION

This application is a continuation-in-part of U.S. Nonprovisional application Ser. No. 11/960,007 filed on Dec. 19, 2007, which claims priority to U.S. Provisional Patent Application No. 60/885,048 filed on Jan. 16, 2007. The parent applications are incorporated by reference herein in their entireties.

BACKGROUND

The invention relates generally to optical fiber technologies. In particular, the invention relates to optical fiber that contains pressure and temperature sensors along its length.

Available electronic sensors measure a variety of values, such as, pH, color, temperature, or pressure, to name a few. For systems that require a string of electronic sensors over a long distance, e.g., twenty to thirty kilometers or longer, powering the electronic sensors becomes difficult. Conventionally, the powering of electronic sensors requires running electrical wire from a power source to each of the electronic sensors. Powering electronic sensors electrically has been unreliable in the petroleum and gas industry. For example, electric wires spanning long distances are subject to a significant amount of interference and noise, thereby reducing the accuracy of the electronic sensors.

Optical fibers have become the communication medium of choice for long distance communication due to their excellent light transmission characteristics over long distances and the ease of fabrication of lengths of many kilometers. Further, the light being transmitted can interrogate the sensors, thus obviating the need for lengthy electrical wires. This is particularly important in the petroleum and gas industry, where strings of electronic sensors are used in wells to monitor downhole conditions.

As a result, in the petroleum and gas industry, passive fiber optic sensors are used to obtain various downhole measurements, such as, pressure or temperature. An optical fiber with a plurality of optical fibers within a fiber optic system can be used to communicate information from wells being drilled, as well as from completed wells. The optical fiber could be deployed with single point pressure-temperature fiber optic sensor. Discrete optical fibers are fully disclosed in International Patent Application No. PCT/US 04/28625, entitled "Optical Sensor with Co-Located Pressure and Temperature Sensors." This application is incorporated herein by reference in its entirety.

Additionally, a series of weakly reflecting fiber Bragg gratings (FBGs) may be written into a length of optical fiber or a single Point Fabry-Perot sensor may be spliced into a length of optical fiber. An optical signal is transmitted down the fiber, which is reflected and/or scattered back to a receiver and analyzed to characterize external parameters along the length of the optical fiber. Using this information, downhole measurements including but not limited to temperature, pressure, and chemical environment may be obtained.

For weakly reflecting FBGs that are written into a length of optical fiber, there is no efficient system of carrying the FBGs and deploying these sensors downhole, and a need exists for such a system.

SUMMARY OF THE INVENTION

An aspect of the invention is directed toward a system to carry an optical fiber having a plurality of optical sensors written or otherwise located thereon. Such optical fibers may extend over long distances and may be deployed in oil and gas wells.

More particularly, in accordance with the present invention the optical sensors are attached to a carrier element, preferably a substantially cylindrical member such as a hollow tube or pipe that has one or more geometric discontinuities where stress concentrations can develop. The sensors measure the strain caused by the stress concentrations, and the measured strain correlates to the pressure applied to the carrier element and sensors.

In one embodiment, the geometric discontinuities comprise a thin-walled section defined on the wall of the cylindrical carrier element. The thin-walled section behaves similar to a diaphragm responsive to the applied pressure, which can be the pressure internal to the carrier element or external thereto.

In another embodiment, the geometric discontinuities comprise changes or alterations to the circular cross-section of the cylindrical carrier element. Examples of such geometric discontinuities include, but are not limited to, one or more substantially flat section portions, one or more concaving portions, one or more convexing portions, one or more corners, or combinations thereof. Optionally, the geometric discontinuities may comprise an oval or polygonal cross-section. Preferably, in this embodiment, the wall of the cylindrical carrier element is not thinned, and a section of the cylindrical carrier is cold-worked or forged into a section with one or more geometric discontinuities.

In another embodiment, the geometric discontinuities comprise a circular cross-section made from at least two different materials. These materials may have different densities and/or different Young's modulus.

In yet another embodiment, the geometric discontinuities comprise a circular cross-section, wherein at least a portion of the carrier element has its density altered.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a schematic perspective view of distributed optical sensors being carried on a portion of a thick walled capillary tube according to the present invention with the optical fiber/sensors omitted for clarity;

FIG. 2 is a cross-sectional view of the capillary tube along line 2-2 in FIG. 1;

FIG. 3A is a cross-sectional view of the capillary tube along line 3-3 in FIG. 1;

FIG. 3B is another embodiment of FIG. 3A;

FIG. 4 is another cross-sectional view of the capillary tube in the longitudinal direction along line 4-4 in FIG. 1.

DETAILED DESCRIPTION

Figure 5A:
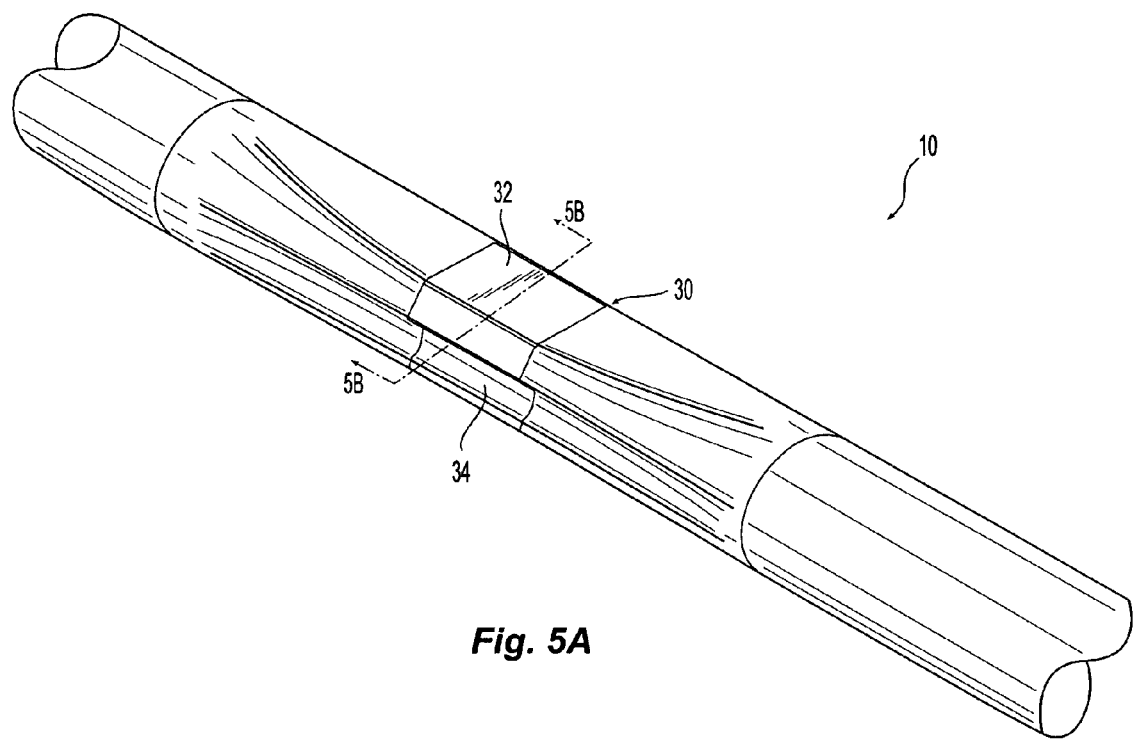
FIG. 5A is a perspective view of another distributed optical sensor.

As illustrated in the accompanying drawings and discussed in detail below, the present invention is directed to optical sensors distributed along an optical fiber. In accordance with the present invention, a plurality of temperature/pressure sensors is formed on an optical fiber. While any type of optical sensors, such as intrinsic or extrinsic Fabry-Perot or Bragg gratings (FBGs) can be used, FBGs are preferred because they can be readily written on to the optical fiber. The optical fiber with optical sensors distributed thereon is preferably carried in the sidewall of a tube or a pipe, such as a capillary tube. The optical sensor and tube can extend over long distances, e.g., several kilometers or miles and can cover the entire depth of an oil and gas well. In a preferred embodiment, the tube is a thick-walled metal capillary tube that is typically used to carry discrete pressure temperature optical sensor(s), such as an intrinsic Fabry-Perot sensor or an extrinsic Fabry-Perot sensor.

Referring to FIG. 1 and in accordance with a first embodiment, thick-walled metal capillary tube 10 is illustrated. Capillary tube 10 can be any length, and in one example tube 10 has an outer diameter of about 0.250 inch and an inner diameter of about 0.185 inch. Capillary tube of any thickness can be used, so long as the capillary tube has sufficient thickness to support the optical fiber and optical sensors. Tube 10 has a longitudinal slot 12 formed along its entire length. Slot 12 should have a width that is sufficient to carry therewithin an optical fiber with cladding(s), and is sufficiently small to have no significant impact on the structural integrity of capillary tube 12. Typically, slot 12 can be machined or cut-out from a conventional capillary tube, as shown in FIG. 2. Along the surface of tube 10 at predetermined locations, areas 14 are profiled to form geometric discontinuities, such as thin-walled sections. As best shown in FIGS. 3A and 3B, a portion of the side wall of tube 10 is machined away to form a thin-walled section 16, which acts as a diaphragm sensitive to pressure differential across it. Thin-walled section 16 may have a flat surface as shown in FIGS. 1 and 3A, or slot 12 may remain on the surface of thin-walled section 16, as shown in FIG. 3B. While only two profiled areas 14 are shown, any number of profiled areas 14 can be formed on tube 10. The spacing between adjacent profiled areas 14 can be selected, wherever pressure and temperature measurements are desired. In one example, the spacing can be a couple of centimeters and up.

Alternatively, slot 12 can be omitted and optical fiber 20 may be attached to capillary tube 10 is a serpentine fashion to absorb the thermal expansion/contraction of tube 10. The attachment can be continuous or at discrete spots. Additionally, optical fiber 20 and the optical sensors written thereon can be attached to the inside of tube 10.

Within each profiled area 14, at least one optical sensor, e.g., FBG 18, is formed on optical fiber 20, as best shown in FIG. 4. FBG 16 is attached to thin-walled section 16 on the outside or inside of tube 10, by any known methods, such as laser welding or by epoxies or adhesives, such that as thin-walled section 18 flexes or bends, FBG 18 also flexes or bends. FBG 18 can also be metallized, by vapor deposition of metal on the sensor or other known techniques. Interior space 22 is optionally sealed or otherwise optionally rendered to hold a substantially constant reference pressure ($P_{ref}$) within. As the pressure to be measured outside of capillary tube 10 changes, the pressure difference flexes thin-walled section 16, which acts like a diaphragm. FBG 18 also flexes along with thin-walled section 16 and changes the frequency of the optical signal reflected from the FBG. A surface instrumentation unit (SIU) (not shown) receives the changed frequency and reads the pressure at the profiled area 14/thin-walled section 16.

In an alternative embodiment, capillary tube 10 and interior space 22 are segmented into a plurality of sealed sections, for example, by walls or membranes orthogonal to the longitudinal axis of the capillary tube similar to that of a bamboo stalk. One or more optical sensors can be located on each segment. An advantage of segmenting the interior space 22 into sealed sections is that if interior space 22 is breached, i.e., exposed to well pressure, only the breached section is affected and the rest of the capillary tube remains sealed for the remaining optical sensors to function.

Between adjacent profiled areas 14, optical fiber 20 is preferably loosely overstuffed or placed within slot 12, as best shown in FIG. 4. The looseness of optical fiber 20 between profiled areas 14 allows slack to absorb thermal expansion and contraction of metal capillary tube 10, and allows the slack necessary to wound capillary tube 10 on to spools. The amount of slack can be determined from the coefficient of thermal expansion of the material of capillary tube 10 and/or the radii of the spools. Optionally, a second sensor or a second FBG 24 is provided proximate to FBG 18 to measure the changes in temperature. In other words, FBG 18 flexes with thin-walled section 16 to measure stress/strain, and sensor 24 measures the temperature changes and compensates for the temperature effect on FBG 18.

In accordance with another embodiment of the present invention, the geometric discontinuity comprises a non-circular cross-section or a cross-section that has a non-circular portion. It is well known that for substantially cylindrical or spherical vessels that are subject to pressure, a circular cross-section can optimally absorb internal or external pressure.

When the wall of such vessel is relatively thin, the normal stress around the vessel is expressed as $$\sigma_h = Pr/t$$

where
$\sigma_h$ is the hoop stress (pounds per square inch).
P is the pressure applied to the vessel,
t is the wall thickness, and
r is the average radius of the cylinder.
See, E. P. Popov "Mechanics of Materials," $2^{nd}$ Ed., Prentice-Hall, 1976, pp. 288-292.

When the wall of such vessel is not thin, the stresses in a thick-walled cylinder under a pressure differential are given by the Lame Equations and are of the form $$\sigma_r = A - B/r^2 = -P_r$$

$$\sigma_h = A + B/r^2$$

and $$\sigma_r = (P_1 r_1^2 - P_2 r_2^2)/(r_2^2 - r_1^2) = A$$

$$B = (r_1^2 r_2^2 (P_1 - P_2))/(r_2^2 - r_1^2)$$

where
A and B are constants, given the values of $P_1$, $P_2$, $r_1$, $r_2$.
r is the variable, as a plot is usually needed of the stresses from $r_1$ to $r_2$.
$\sigma_r$ is radial stress at r, and
$\sigma_h$ is the hoop stress at r.
Where $r_1$ is the inner radius of the thick walled cylinder and $P_1$ is the pressure at that radius and $r_2$ and $P_2$ are the outer radius and pressure. See, E. P. Popov "Mechanics of Materials," $2^{nd}$ Ed., Prentice-Hall, 1976, pp. 557-564.

As shown above, when the cross-section is circular (i.e., the inner and outer radii are substantially constant) the stresses on the cylindrical vessel are substantially constant along the radial direction, but when there are geometric discontinuities in (i.e., either the inner radius or the outer radius varies or both) the circular cross-section, localized higher stresses or stress concentrations can occur at or proximate to these geometric continuities. In accordance with this embodiment, the ability to produce stress concentrations is employed to provide stress/strain measurements at or proximate to the geometric discontinuities. These stress/strain measurements can be correlated to the pressure applied to the vessel or tube, when sensors such as optical sensors 18 are deployed proximate to these geometric discontinuities.

An example of a geometric discontinuity is illustrated in FIG. 3A, where the inner radius is substantially constant in the radial direction around tube 10, including at thin-walled section 16, but the outer radius (shown at Ro1 and Ro2) varies in the radial direction. A stress concentration is produced at thin-walled section 16, and this stress concentration yields a stress concentration profile that can be measured by FBG 18 to give the pressure at or proximate to the stress concentration.

Figure 5B:
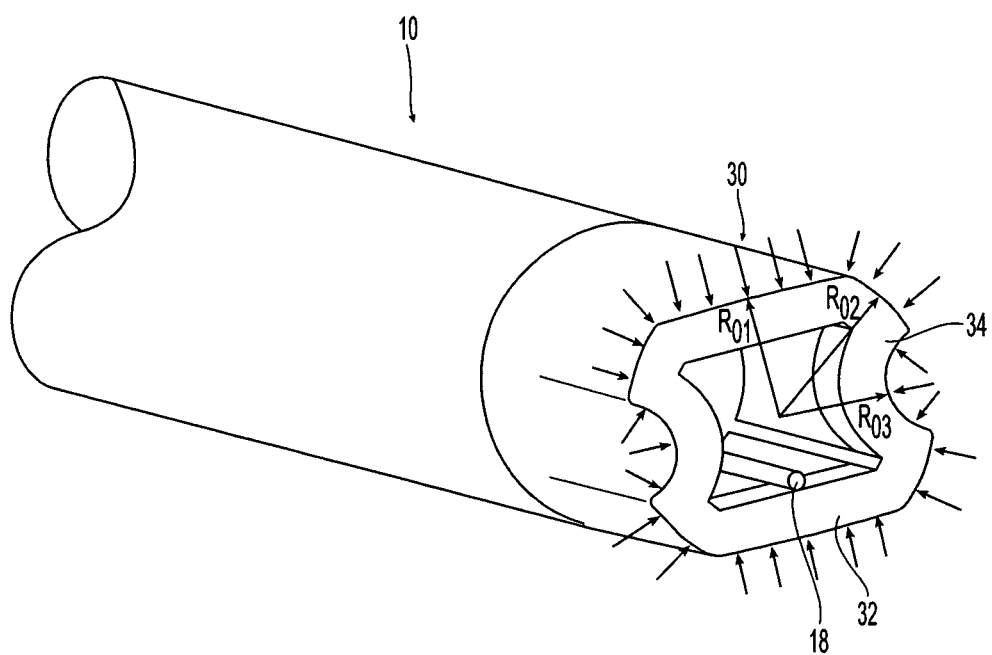
FIG. 5B is a cross-sectional view of FIG. 5A along line 5B-5B.

Another example of a geometric discontinuity is illustrated in FIGS. 5A and 5B. Tube 10 comprises test section 30, which contains a geometric discontinuity comprising at least one substantially flat section 32 and/or at least one concave section 34. Flat section 32 acts similar to a diaphragm and tends to bow inward in response to external pressure as shown. Concave section 34 may bow outward or inward depending on the amount of pressure applied on the concave section, which tends to bow it inward, and on flat section 32, which tends to bow the concave section outward. Tube 10 and/or test section 30 are hollow, i.e., contains a cavity, which can be filled with a compliant material, a fluid, an oil, a liquid or a gel.

Referring to FIG. 5B, the outer radius of test section 30 varies radially along its circumference, as illustrated at Ro1, Ro2 and Ro3. Moreover, the inner radius also varies in the radial direction. It is to be noted that both the inner and outer radii do not have to vary to create a geometric discontinuity. The variance of one radius is sufficient to produce localized stress concentration. As used herein, the radial direction is the direction from the center of the test section extending radially outward, as illustrated by the arrows in FIGS. 3A and 5B.

Figure 5C:
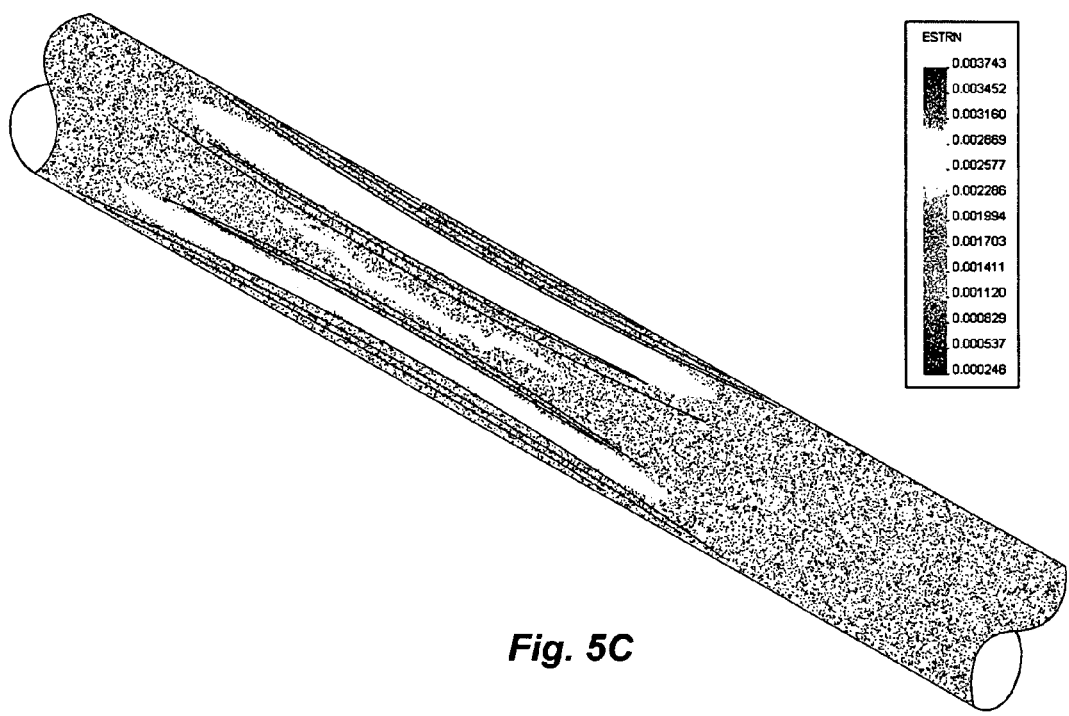
FIG. 5C is a stress-strain graph of the embodiment of FIG. 5A.

A stress-strain analysis was conducted using a Finite Element Analysis (FEA) modeling software. An external pressure of about 15,000 psi was applied to test section 30 of FIGS. 5A and 5B. A three-dimensional plot of strain is shown in FIG. 5C. Lighter gray zones depicting higher strain are shown to coincide with sections 32 and 34, which indicate that FBG 18s attached to such sections, as shown in FIG. 3B, can detect the strain. While it is preferred that FBG sensor 18 aligns with the areas of stress concentration, it is only necessary for the sensor to be in contact with a portion of the stress concentration area. A suitable FEA software is SolidWorks CosmosWorks Advanced Professional version 2006.

FEA can be used to create a calibration curve for the sensor. For example, for every known applied pressure, a FEA calculated strain is recorded. Thereafter, a stress/strain curve can be established. When the test section is deployed, a measured strain is plotted on the calibrated stress/strain curve and a stress (or pressure) can be readily ascertained. Alternatively, an experimental stress/strain curve using known applied pressures can also be employed.

Other numerical modeling techniques, such as finite difference (FD) or other nodal numerical modeling techniques, can be used and the present invention is not limited to any particular numerical modeling techniques.

While FBG sensor 18 can be attached to the outside of test section 30, similar to the embodiment of FIGS. 1-4, it is preferred that FBG sensors 18 and optical fiber 20 be attached inside test section 30, as shown in FIG. 3B. A preferred way to install optical fiber 20 and sensors 18 is to roll a length of tube 10 with multiple test sections 30 around a spool. Since sections 32 are substantially flat, they have the tendency to lie flat against the surface of the spool. A corresponding length of optical fiber 20 with FBG sensors written thereon at locations corresponding to substantially flat sections 32 is pumped through tube 10 by a gas, e.g., air, or a liquid, e.g., water. Thereafter, an epoxy is pumped through tube 10 to attach or adhere the FBG sensors to tube 10.

Figure 6A:
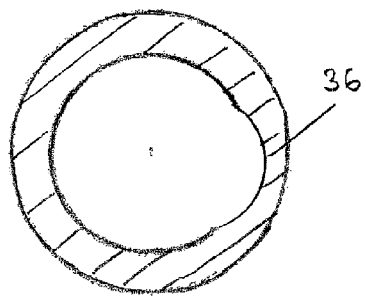
FIGS. 6A-6H are cross-sectional views of alternative embodiments to the sensors of FIGS. 3A-3B and 5A-5B.
Figure 6B:
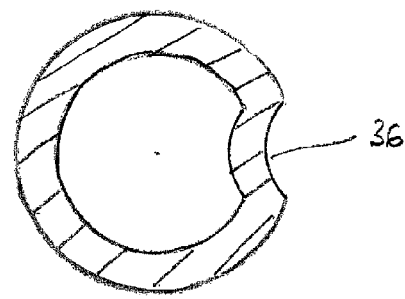
Figure 6C:
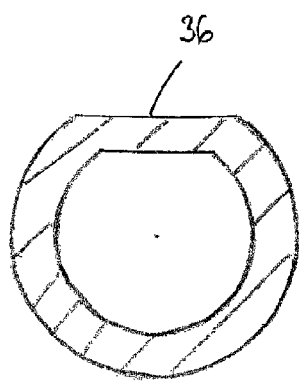
Figure 6D:
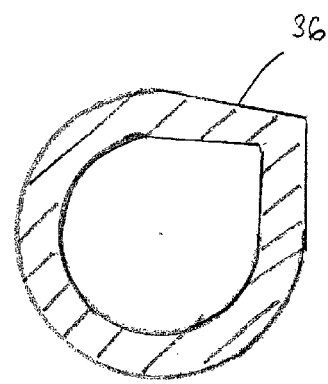

Other exemplary, non-limiting geometric discontinuities 36 are formed on test section 30, as illustrated in FIGS. 6A-6D. The inner radius can change as shown in FIG. 6A; the outer radius can change as shown in FIG. 3A; and both inner and outer radii can change as shown in FIGS. 6B-6D and in FIGS. 5A and 5B. Geometric discontinuities 36 can comprise a divot or dimple (FIG. 6B), a flatten section (FIG. 6C), a corner (FIG. 6D) or any combination thereof. Furthermore, the thickness of test section 30 can vary (FIGS. 3A, 3B, and 6A), or stay substantially the same (FIGS. 5A-5B, 6B-6D) except at sharp corners. Geometric discontinuities also includes shapes such as oval and polygonal.

Figure 6E:
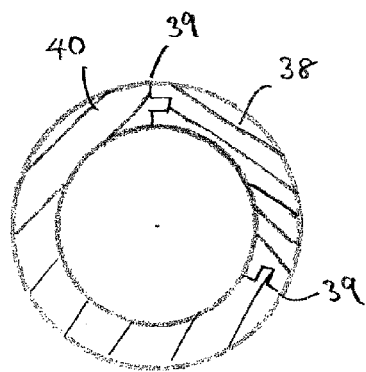

In yet another embodiment, stress concentration profiles can be formed on cylindrical tube 10 with substantially constant thickness but varying density or Young's modulus. As shown in FIG. 6E, test section 30 comprises portion 38 and portion 40 joined by dovetail connection at joints 39, although other connections can be used. Preferably, portions 38 and 40 are made from different materials having different density or different Young's modulus, so that portion 38 reacts to pressure in a different manner than portion 40. It is expected that stress concentration profiles form at or proximate to joints 39, where the discontinuity in density of Young's modulus occurs. Portions 38/40 can be made from stainless steel/aluminum, metal/polymer, etc.

Figure 6F:
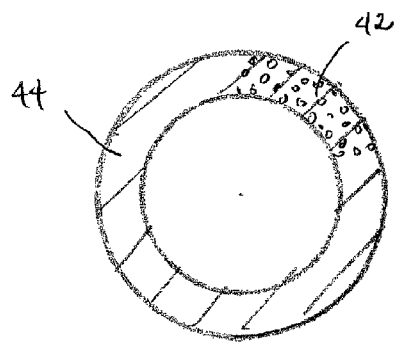

Alternatively, as shown in FIG. 6F, test section 30 can be made from a single material, but portion 42 has its density or specific gravity reduced for example by adding a foaming agent to a polymer, while portion 44 has its density unaltered. It is expected that stress concentration profiles develop in lower density portion 42 or at the boundaries of portions 42 and 44.

Figure 6G:
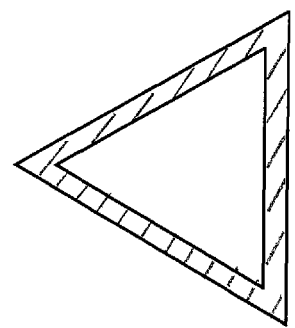
Figure 6H:
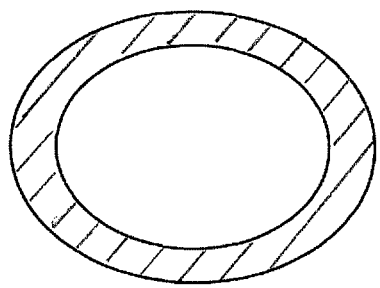

Furthermore, test section 30 can assume an oval or polygonal shape, as shown in FIGS. 6G-6H. In accordance to hoop stress theory or Lamé theory, section with smaller radius can experience greater stress/strain than section with larger radius. Hence, for oval cross-section it is expected that stress concentrations can develop in the transition from the major axis to the minor axis of the oval. For the polygonal cross-section, stress concentrations can develop along the linear sides, when these sides act like diaphragms or along the corners where one side transitions to adjacent sides. The polygonal cross-sections can be regular or irregular polygons.

For the purpose of this invention, the term geometric discontinuities and related terms are defined to also include materials of different Young's modulus or densities (e.g., FIG. 6E), materials with a portion with its density modified (e.g. FIG. 6F), and oval or polygonal cross-sections (e.g., FIGS. 6G-6H).

Multiple test sections 30 can be formed on a metallic cylindrical tube 10 by any known metal working techniques, including but not limited to, cold-working, swaging, forging, etc. Tube 10 can also be made with polymeric materials, including thermoplastics and thermosets. For polymeric tubes 10, test sections 30 can be formed by hot presses using heat and pressure, injection molding, casting or other known techniques. The present invention is not limited to any particular manufacturing technique or any particular materials.

Since optical fiber 20 can extend for long distances, it is expected that a large number of optical fibers are written or otherwise located on the optical fiber. As such, it is preferred that advanced signal processing techniques are employed to distinguish reflected signals from the multiple optical sensors. Such advanced techniques are disclosed in commonly owned U.S. Pat. No. 7,282,698, entitled "System and Method for Monitoring a Well". The '698 patent is incorporated herein by reference in its entirety. Among other things, the '698 patent discloses a physical interleaving technique, where pluralities of sensors are disposed along the length of an optical fiber on each side of a reference reflector. In this technique, the corresponding sensors are placed at offset distances from the reflector to increase the sensing length. Additionally, physical interleaving technique can be expanded to combine multiple sensing lengths within one optical fiber to increase an overall sensing length. The '698 patent also discusses combining multiple sensing length physical interleaving technique with wavelength division multiplexing (WDM), where each individual sensing length is designed to respond only to a wavelength that is slightly different from the next sensing length. This can further increase the sensing length by a function of the number of wavelength divisions that are present. Additionally, additional sensing length can be generated by using an aliasing technique, more specifically employing narrowband FBGs placed outside of the Nyquist sampling distance. Additional signal processing techniques are discussed in or cited within the '698 patent.

While it is apparent that the illustrative embodiments of the invention disclosed herein fulfill the objectives of the present invention, it is appreciated that numerous modifications and other embodiments may be devised by those skilled in the art. For example, capillary tube 10 can be replaced by a carrier of another shape, such as spherical or cylindrical pressure vessels that have been profiled to form thin-walled sections thereon. Additionally, feature(s) and/or element(s) from any embodiment may be used singly or in combination with feature(s) and/or element(s) from other embodiment(s). Therefore, it will be understood that the appended claims are intended to cover all such modifications and embodiments, which would come within the spirit and scope of the present invention.

We claim:

1. A carrier for an optical fiber having at least one optical sensor located thereon, said carrier comprises:
   a hollow test section comprising at least one substantially planar section and one curved section having a surface that forms a part of a surface of the test section,
   wherein in response to a pressure applied to the test section, a stress concentration is formed proximate to either the substantially planar section or the curved section, and
   wherein a length of the optical fiber including at least one optical sensor is directly adhered to at least a part of the surface of either the substantially planar section or the curved section.

2. The carrier of claim 1, wherein the substantially planar section comprises a thin-walled section.

3. The carrier of claim 1, wherein the curved section comprises at least one concave section.

4. A carrier for an optical fiber having at least one optical sensor located thereon, said carrier comprises;
   a hollow test section comprising at least one geometric discontinuity having a surface that forms a part of a surface of the test section,
   wherein in response to a pressure applied to the test section, a stress concentration is formed proximate to the geometric discontinuity, and
   wherein a length of the optical fiber including at least one optical sensor is directly adhered to at least a part of the surface of the geometric discontinuity, wherein the geometric discontinuity comprises two materials having different Young's modulus.

5. A carrier for an optical fiber having at least one optical sensor located thereon, said carrier comprises:
   a hollow test section comprising at least one geometric discontinuity having a surface that forms a part of a surface of the test section,
   wherein in response to a pressure applied to the test section, a stress concentration is formed proximate to the geometric discontinuity, and
   wherein a length of the optical fiber including at least one optical sensor is directly adhered to at least a part of the surface of the geometric discontinuity.

6. The carrier of claim 5, wherein the geometric discontinuity comprises at least two portions having different densities.

7. The carrier of claim 1, wherein the pressure is applied to the outside of the carrier.

8. The carrier of claim 1, wherein the sensor is adhered to the inside of the carrier.

9. The carrier of claim 1, wherein the test section is sealed.

10. The carrier of claim 1, wherein the test section is capable of holding a pressure.

11. The carrier of claim 1, wherein the carrier comprises a tube.

12. The carrier of claim 1, wherein the optical fiber further comprises a temperature optical sensor proximate to said optical sensor.

13. The carrier of claim 1, wherein the at least one pressure optical sensor is metallized.

14. The carrier of claim 1, wherein the hollow test section includes a cavity that is filled with a compliant material, a liquid or a gel.

15. The carrier of claim 11, wherein the at least two portions are made of different materials.

16. The carrier of claim 1, wherein the optical sensor is adhered to the substantially planar section.

17. The carrier of claim 6, wherein at least one of the portions has its density altered.

* * * * *